H. G. Eastman.
Hand Support.
Nº 2,634  Patented Nov. 5, 1861.
33,638.
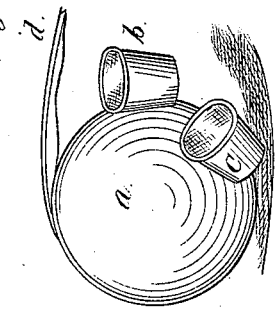
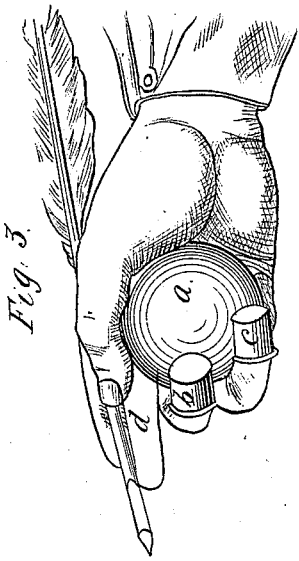
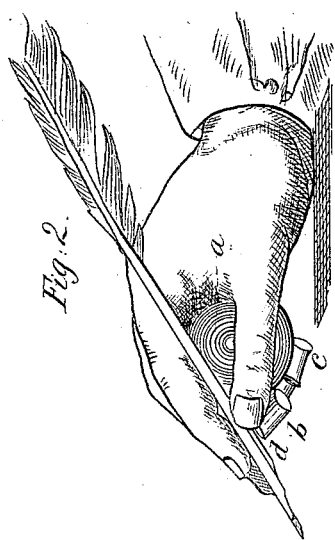
Witnesses:
James K. Seaman
Alonzo Townsend
Inventor:
H. G. Eastman

UNITED STATES PATENT OFFICE.

H. G. EASTMAN, OF POUGHKEEPSIE, NEW YORK.

PENMAN'S ASSISTANT.

Specification forming part of Letters Patent No. 33,638, dated November 5, 1861.

*To all whom it may concern:*

Be it known that I, H. G. EASTMAN, of Poughkeepsie, Dutchess county, State of New York, have invented a certain new and useful article or instrument for the use of pupils and others in learning the art of writing, which I have designated the "Penman's Assistant;" and I do hereby declare the following to be a full description of the same.

The nature of my invention consists in forming a hand and finger rest or support for the pupil by means of a ball fitting the palm of the hand when closed in the act of writing, and having attached thereto in suitable positions thimbles or fingers for the support of the middle, fourth, and little fingers, so that the pen, when held between the thumb and forefinger, will rest against the end of the middle finger in an easy and natural position for forming the letters, and thus compel the pupil to acquire habits of correct penmanship by an open hand, instead of the cramped and irregular hand almost universally found among the pupils at school, consequent upon the pen being held by the fingers in a fist-like grip; but to describe my invention more particularly I will refer to the accompanying drawings, forming a part of this specification, the same letters of reference, wherever they occur, referring to like parts.

Figure 1 represents the instrument having the thimbles for the fourth and little fingers and elastic rest for the middle finger attached thereto. Fig. 2 represents the instrument as held by the pupil in the act of writing. Fig. 3 represents the instrument as held in the palm of the hand and showing the position of the fingers.

Letter A represents a sphere of metal or other suitable material or composition that will answer a like purpose of filling the palm of the pupil's hand. Attached to the sides of the sphere in suitable positions are three finger-supports $b$, $c$, and D. The supports $b$ and $c$ are in the form of elastic thimbles, so as to be readily adapted to the size of the fingers, and are attached directly to the sides of the sphere for the support of the fourth and little fingers. As these fingers in the act of writing have no motions in themselves, their positions are fixed for the purpose of giving to the hand the proper shape for holding the pen. The support $d$ for the middle finger is formed of a thin elastic concave piece of metal or other suitable material of the length of the finger and attached at the back end to the sphere, while the outer end is projected forward, so as to keep the finger well open to hold the pen in the proper position. This finger may have a thimble attached to it for holding the end of the middle finger of the writer; but it is not material, as the rounding up of the sides of the metal will form a support sufficiently steady for all the purposes of writing. It will be obvious that by this device the hand of the pupil is kept in its proper position, and as the hollow of the hand when arched in the act of writing is hemispherical the ball adapts itself readily to the hand, and the pupil after a few times using it not only finds it a relief to the cramped positions of the fingers, but at the same time compels him to rely upon the motions of the entire hand and arm, instead of the cramped movements of the fingers alone, in forming the letters while writing.

It will be obvious that my invention may be modified in form by making the supporters for the hand and fingers of a skeleton or glove shape; but as such modifications present no new suggestions in the principles upon which my invention is constructed I desire it to be understood that my invention is intended to embrace such modified forms of construction, should circumstances require it.

Having now described my invention and its mode of construction, I will proceed to set forth what I claim and desire to secure by Letters Patent of the United States—

The use of a spherical or other shaped instrument having finger rests or supports attached thereto, substantially as described, for supporting the hand and fingers, for the purpose hereinbefore set forth.

H. G. EASTMAN.

Witnesses:
 JAMES H. SEAMAN,
 ALONZO TOWNSEND.